US012735930B2

(12) United States Patent
Palmgren

(10) Patent No.: US 12,735,930 B2
(45) Date of Patent: Sep. 15, 2026

(54) ELECTROMAGNETIC GATE ARRANGEMENT, A MAZE COMPRISING AN ELECTROMAGNETIC GATE ARRANGEMENT AND A METHOD FOR OPERATING AN ELECTROMAGNETIC GATE ARRANGEMENT

(71) Applicant: Rolf Palmgren, Sandhem (SE)

(72) Inventor: Rolf Palmgren, Sandhem (SE)

(73) Assignee: Rolf Palmgren, Sandhem (SE)

( * ) Notice: Subject to any disclaimer, the term of this patent is extended or adjusted under 35 U.S.C. 154(b) by 388 days.

(21) Appl. No.: 18/576,555

(22) PCT Filed: Jun. 16, 2022

(86) PCT No.: PCT/EP2022/066475
§ 371 (c)(1),
(2) Date: Jan. 4, 2024

(87) PCT Pub. No.: WO2023/280544
PCT Pub. Date: Jan. 12, 2023

(65) Prior Publication Data

US 2024/0360714 A1 Oct. 31, 2024

(30) Foreign Application Priority Data

Jul. 8, 2021 (SE) .................................... 2150914-6

(51) Int. Cl.
*E05D 15/50* (2006.01)
*A63J 11/00* (2006.01)
(Continued)

(52) U.S. Cl.
CPC .......... *E05D 15/505* (2013.01); *E05F 15/614* (2015.01); *E06B 11/04* (2013.01); (Continued)

(58) Field of Classification Search
CPC ..... E05D 15/505; E05D 15/50; E05D 15/502; E05D 15/507; E05D 15/52; E05D 7/02; (Continued)

(56) References Cited

U.S. PATENT DOCUMENTS 5,210,906 A * 5/1993 Aihara ...................... E05D 1/06 16/272
5,530,992 A * 7/1996 Baermann ............. E05D 15/505 49/382

(Continued)

OTHER PUBLICATIONS

International Search Report and Written Opinion for International Application No. PCT/EP2022/066475, mailed Oct. 4, 2022, (9 pages).

*Primary Examiner* — Justin B Rephann
(74) *Attorney, Agent, or Firm* — Kagan Binder, PLLC

(57) ABSTRACT

Provided is an electromagnetic gate arrangement (1) comprising a door blade (10) having a first edge (11) and a second edge (12), at least a first gate post (20*a*) and a second gate post (20*b*). The door blade (10), at the first and second edge (11, 12) respectively, comprises at least one connecting arrangement (100) comprising magnetic means (101, 102, 103, 104) and the first and second gate post (20) comprises a respective first and second receiving arrangement (200*a*, 200*b*) comprising electromagnetic means (201, 202, 203, 204), wherein the electromagnetic means (201, 202, 203, 204) are active by electromagnetic flux provided via an electric current for enabling detachable engagement between the gate posts (20) and the door blade edge (10). The first receiving arrangement (200*a*) is arranged for enabling rotational movement of the door blade (10) around the first gate post (20) when disengaged from the second receiving arrangement (210). There is also provided a maze using an electromagnetic gate arrangement.

16 Claims, 9 Drawing Sheets

(51) Int. Cl.
*E05F 15/614* (2015.01)
*E06B 11/04* (2006.01)

(52) U.S. Cl.
CPC .......... *A63J 11/00* (2013.01); *E05Y 2201/462* (2013.01); *E05Y 2900/142* (2013.01); *E05Y 2900/40* (2013.01)

(58) Field of Classification Search
CPC ... E05D 1/06; E06B 1/526; E06B 1/52; E06B 2003/7055; E06B 2003/7046
See application file for complete search history.

(56) References Cited

U.S. PATENT DOCUMENTS

| | | | | |
|---|---|---|---|---|
| 6,085,463 | A * | 7/2000 | Yoshikawa | E05D 15/50 49/233 |
| 2007/0163180 | A1 | 7/2007 | Steinberg | |
| 2019/0145142 | A1 * | 5/2019 | Heater | D06F 39/14 68/196 |
| 2019/0177904 | A1 * | 6/2019 | Heater | E05D 15/52 |
| 2022/0025689 | A1 * | 1/2022 | Ireland | E05D 7/02 |

* cited by examiner

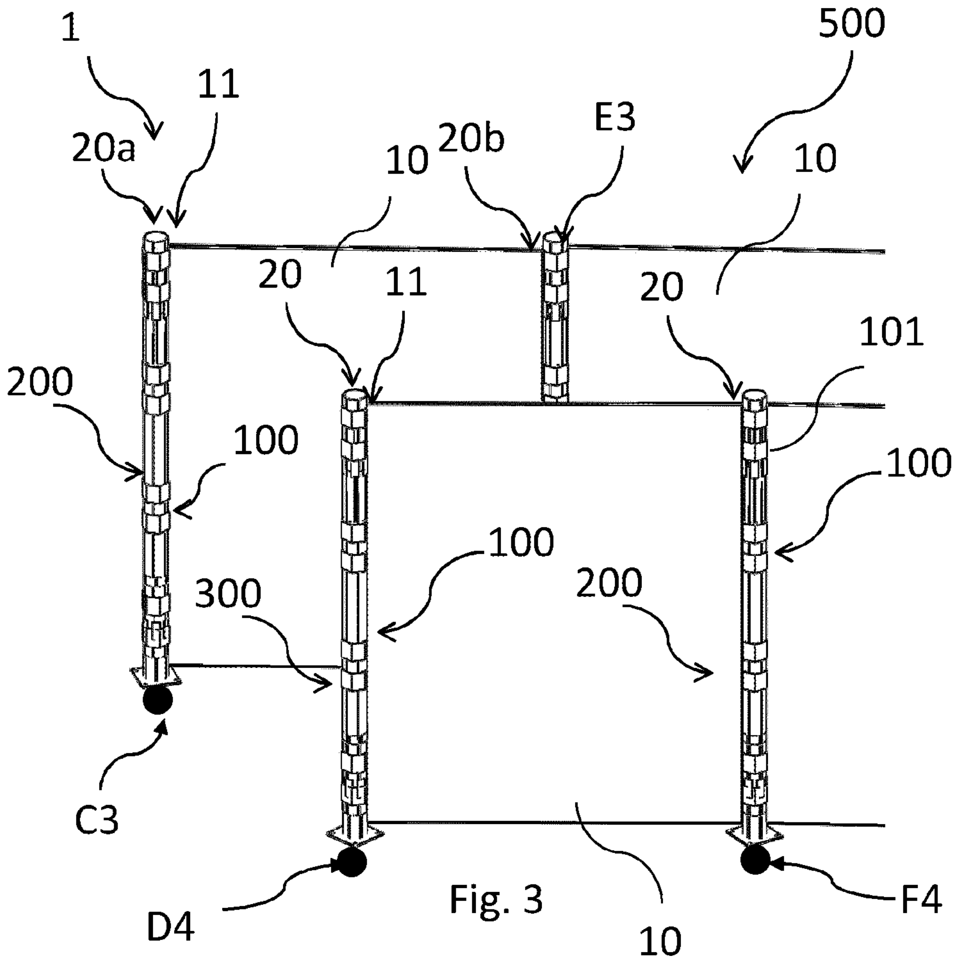
Fig. 3
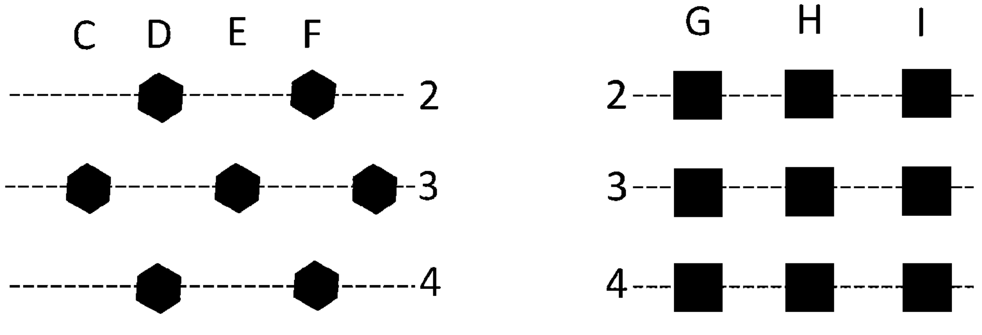
Fig. 4a
Fig. 4b

ELECTROMAGNETIC GATE ARRANGEMENT, A MAZE COMPRISING AN ELECTROMAGNETIC GATE ARRANGEMENT AND A METHOD FOR OPERATING AN ELECTROMAGNETIC GATE ARRANGEMENT

CROSS-REFERENCE TO RELATED APPLICATIONS

This application claims priority to International Application No. PCT/EP2022/066475, filed Jun. 16, 2022 and titled "ELECTROMAGNETIC GATE ARRANGEMENT, A MAZE COMPRISING AN ELECTROMAGNETIC GATE ARRANGEMENT AND A METHOD FOR OPERATING AN ELECTROMAGNETIC GATE ARRANGEMENT," which in turn claims priority from a Swedish Patent Application having serial number 2150914-6, filed Jul. 8, 2021, both of which are incorporated herein by reference in their entireties.

TECHNICAL FIELD

The present disclosure relates to a gate, and especially to a gate with electromagnetic type hinge connectors. The present disclosure also relates to a method of operating an electromagnetic type gate.

BACKGROUND

Devices exist that can rotate a door blade about a door post axis with mechanical means. Such devices allows the door to rotate by manual force and has a mechanical door catch or lock to hold the door blade in engagement with the door post. Other devices allow a door or window to be hooked onto its frames, and allow mechanical rotation. Such devices can be equipped with an electrical actuator for automatic operation. However, these arrangements are inflexible and fixed to its frames. In certain events, a hinge which is detachable is desired, but the known motorized hinges are limited in its connectivity and programmability. It is therefore desired an improved solution relating to detachable door arrangements.

SUMMARY

It is an object of the present invention to provide an improved solution that alleviates the mentioned drawbacks with present devices. Furthermore, it is an object to provide an arrangement with a gate having electromagnetic means for detachable connection to a gate post, and means allowing for motorless rotation. There is also an object to provide a programmable maze using the electromagnetic gate.

The problem solved by the invention is twofold: a) how to operate a gate without a motor being built in or placed above or below the gate post, and b) how to make the gate inexpensive enough to allow a large array of gates to form a programmable maze for fun or exciting learning.

According to the first aspect of the invention, there is provided a gate arrangement comprising a door blade having a first edge and a second edge, at least a first gate post and a second gate post. The door blade at the first and second edge respectively comprises at least one connecting arrangement which comprising magnetic means and the first and second gate post comprises a respective first and second receiving arrangement comprising electromagnetic means. The electromagnetic means are active by electromagnetic flux provided via an electric current for enabling detachable engagement between the gate posts and the door blade edge. The first receiving arrangement may be arranged for enabling rotational movement of the door blade around the first gate post when disengaged from the second receiving arrangement.

By an arrangement which has electromagnetic means to connect a door blade to a gate post, a flexible gate may be provided. Preferably there may be more than one gate post. The door blade may thus swing around any of the gate posts. The gate post may be arranged to enable rotation of the door blade a full 360 degrees. The gate post may be arranged to enable rotation of the door blade more than 360 degrees. The rotation may be nearly friction free by bearings in the gate post. The rotation may be stepless. The door blade may be arranged to rotate any angle. Any of the gate post may connect to the door blade. When disconnected from one of the gate posts, the electromagnetic means of the second gate post may hold the door blade. The electromagnetic means of the second door post may connect to the door blade when the second door blade edge is near the second gate post. When connected to the second gate post, the first gate post may disengage the connecting means at the first door edge. When disconnected from the first gate post, the door blade may rotate around the second gate post. The gate post is generally vertical for arrangement on a substantially horizontal surface. However, the invention may be applicable to other technical fields, such as windows.

In one embodiment, the gate post may comprise at least one cylinder arranged concentrically with the gate post and at least partially around the circumference of the gate post. A first cylinder may be a primary rotating cylinder onto which the electromagnetic means may be arranged to provide rotation to the receiving arrangement. This is an advantage since the primary rotating cylinder ensures that rotation can be obtained.

In one embodiment, a second cylinder may be a secondary rotating cylinder onto which the electromagnetic means is arranged for providing passive rotation and stability to the arrangement. The second rotating cylinder may thus follow the rotation of a door blade which is connected to the electromagnetic means at the primary rotating cylinder. By having electromagnetic means disposed along the gate post at the respective cylinders, the gate post may obtain a substantially vertical orientation. There may be several secondary rotating cylinders that provides stability to the gate arrangement. A third cylinder may be a static cylinder onto which electromagnetic means may be arranged for providing static non-rotating position. After a rotation, or when a rotation is not desired, the door blade may be connected to the static cylinder which also preferably may have electromagnets arranged thereto. This provide static non-rotating position of the door blade. When engaged to the static cylinder, the door blade may be considered to be locked.

In one embodiment, the electromagnetic means may be arranged to provide attraction to the magnetic means through positive electric flux for engagement. In contrast, repelling the magnet means may be obtained through reversed negative flux for disengagement of the door blade.

In one embodiment, the electromagnetic means may be in the form of a polygonal sleeve having equally spaced facets around the circumference. In one embodiment, the facets may be flat. In one embodiment, the facets may be convex or concave. The connecting arrangement of the door blade may comprise corresponding permanent magnets for engagement to the facet. The polygonal sleeve may present a number of facets. For instance, the polygonal sleeve may be a hexagonal sleeve, having six equi-spaced facets. The polygonal sleeve may also be for instance square or triangular, or any other suitable shape. The reason for wanting to have a number of equi-spaced facets, each facet may be connectable to a corresponding permanent magnet on the door blade. The permanent magnet may be substantially flat in order to properly connect to the facet. Alternatively, the facets may be convex or concave. This may allow for a more secure connection. In the event of a convex or concave facet, the surfaces are thus not flat. A corresponding permanent magnet suitable for a no-flat facet may be needed. Preferably, the permanent magnet assumes substantially the same shape as the electromagnetic facet. Furthermore, a convex or concave facet may change the handover from one gate post to another.

In one embodiment, the gate arrangement further may comprise a drive arrangement for providing rotation to the receiving arrangement. This is an advantage since the rotation may be automatic. In a large arrangement with several gate posts and door blades, it may be preferable with an automatic drive.

In one embodiment, the gate arrangement may further comprise a third gate post comprising a third receiving arrangement comprising electromagnetic means and arranged for moving a door blade into a predetermined position, the gate arrangement may be arranged to disconnect the electromagnets at the static cylinder at the first gate post. The gate arrangement may further disconnect the door blade at the second edge by disconnecting the first electromagnetic means of the second gate post from corresponding permanent magnets. The gate arrangement may further rotate the door blade at the first door post by providing rotation to the primary rotating cylinder via the drive arrangement. The gate arrangement may further activate a third receiving arrangement by applying an electromagnetic flux of the electromagnetic means at the primary rotating cylinder of the third gate post in order to attract and engage with the receiving arrangement of the second edge when approaching the third gate post. The gate arrangement may further, upon engagement of the third receiving arrangement, engage at least one of the electromagnetic means of the static cylinder at first and/or third gate post to the corresponding permanent magnets at the door edge.

A second aspect is to provide a method for operating an electromagnetic gate arrangement. The gate arrangement may comprise a door blade having a first edge and a second edge. The gate arrangement may further comprise a connecting arrangement comprising magnetic means and which connecting means may be arranged at the respective edge. The gate arrangement may further comprise a plurality of gate posts. A first gate post and a second gate post may comprise a respective first and second receiving arrangement, each comprising electromagnetic means. The electromagnetic means may be activated by electromagnetic flux provided via an electric current, for enabling detachable engagement between the gate posts and the door blade edge wherein the first receiving arrangement is arranged for enabling rotational movement of the door blade around the first gate post when disengaged from the second receiving arrangement wherein the method may comprises the steps:

- in an initial fixed state, providing attracting electromagnetic flux to the electromagnetic means of the receiving arrangement to attract the magnetic means of the door blade to cause engagement between the first and second connecting arrangements of the door blade and the receiving arrangements,
- in a movement preparation state, providing a repelling electromagnetic flux to at least one of the electromagnetic means for repelling and disconnecting the connecting arrangement of the second door edge,
- moving the door by applying rotation to the receiving means of the first gate post while connected to the connecting arrangement at the first door edge,
- apply attracting electric flux to the receiving arrangement of a third gate post when the second door edge is approaching the third gate post so that the magnets of the connecting arrangement of the second door edge attracts the electric-magnetic means of the third gate post and engages to the door blade.

The method of operating a gate arrangement comprises a plurality of gate posts arranged in an array of positional nodes numbered according to an internal coordinate system, wherein a door blade connected to a gate post at one node is connectable to a gate post adjacent to that node.

Another aspect of the invention is to provide a driving arrangement for providing rotational movement of a door blade of a gate arrangement, the drive arrangement may comprise a motor, a drive shaft arranged concentrically with a gate post, a drive means for transmitting the movement between motor and drive shaft,

- wherein the drive shaft may be in connection with the receiving arrangement via a primary rotating cylinder of the gate post onto which electromagnetic means of the receiving arrangement is arranged. In that way, upon drive of the motor, the movement may be transmitted via the drive means to the drive shaft causing rotation of the drive shaft and thereby causing rotation of the receiving arrangement.

In one embodiment of the drive arrangement, the drive means may be connected to the drive shaft via a pulley element such as a belt pulley, sprocket wheel, spur gear or the like, and wherein the drive means may be a belt, chain, wire rope or the like.

In one embodiment of the drive arrangement a first drive means may be arranged in a cascaded manner to a second drive means via the pulley arrangement. In that way, drive of a common motor transmits movement to a plurality of drive means in the gate arrangement.

In one embodiment of the drive arrangement, the drive arrangement may comprise a drive clutch in the gate post which upon deactivation causes disengagement of the transmission of movement between the primary rotating cylinder and the drive shaft in order to allow free rotation of the receiving arrangement independent of the drive shaft.

A third aspect of the invention is to provide a programmable maze comprising a gate arrangement which comprises a plurality of gate posts arranged in an array of positional nodes numbered according to an internal coordinate system. The programmable maze, comprising at least one door blade connected to a gate post at one node, wherein the door blade is connectable to a gate post adjacent to that node in response to a communication signal from a programming software.

A fourth aspect of the invention provides for controlling a programmable maze comprising a gate arrangement according any of the claims 1-7. The control system may comprise a programming software programmable according to a desired layout of the maze. The programming software being configured to communicate with a driving arrangement. An electronic communication device may be arranged in each operable gate post. An angle measurement system for determining the amount of rotation to be applied by the driving arrangement, wherein the control system is arranged to:

receive an instruction from the programming software of a predetermined maze layout, wherein the maze layout is presented in an internal coordinate system stating a plurality of nodes which presents the gate post.

transmit, to each node, nodal angular instruction in order to achieve the predetermined maze layout, start the common motor in order to start drive of the drive means to cause rotation of the drive shafts, in the node in which a gate post is arranged not to rotate, disengage a drive clutch in order to prevent rotation from the drive shaft.

BRIEF DESCRIPTION OF THE DRAWINGS

The invention will in the following be described in more detail with reference to the enclosed drawings, wherein:

FIG. 3. Illustrates a gate arrangement according to an embodiment of the present invention.

FIG. 4. Illustrates a gate arrangement according to an embodiment of the present invention.

DESCRIPTION OF EMBODIMENTS

The present invention will be described more fully hereinafter with reference to the accompanying drawings, in which preferred embodiments of the invention are shown.

The purpose with the invention is to enable creation of a reasonably large and very flexible, programmable maze, by use of inexpensive motorless gates that rotate to form paths in the maze.

Figure 1:
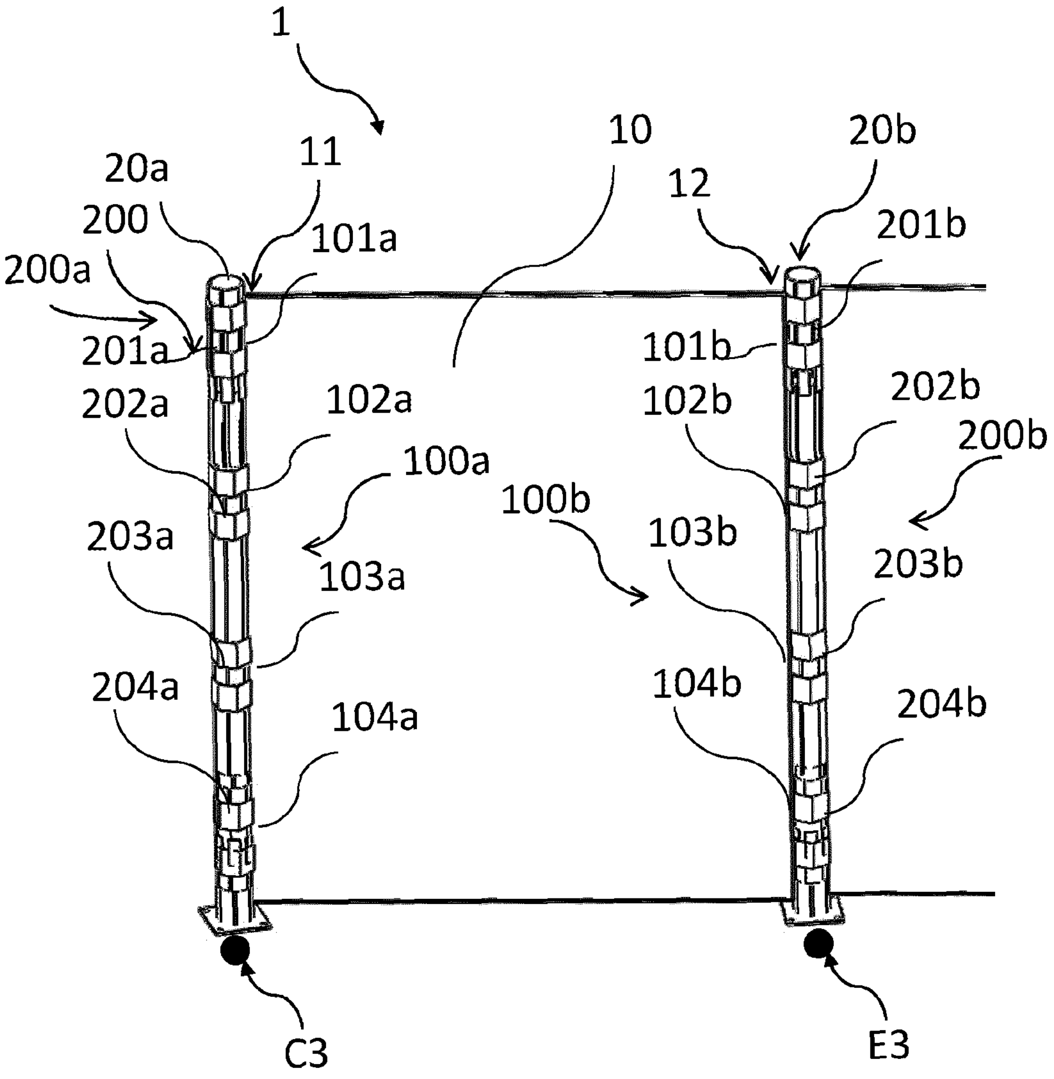
FIG. 1. illustrates a gate arrangement according to an embodiment of the present invention.
Figure 2:
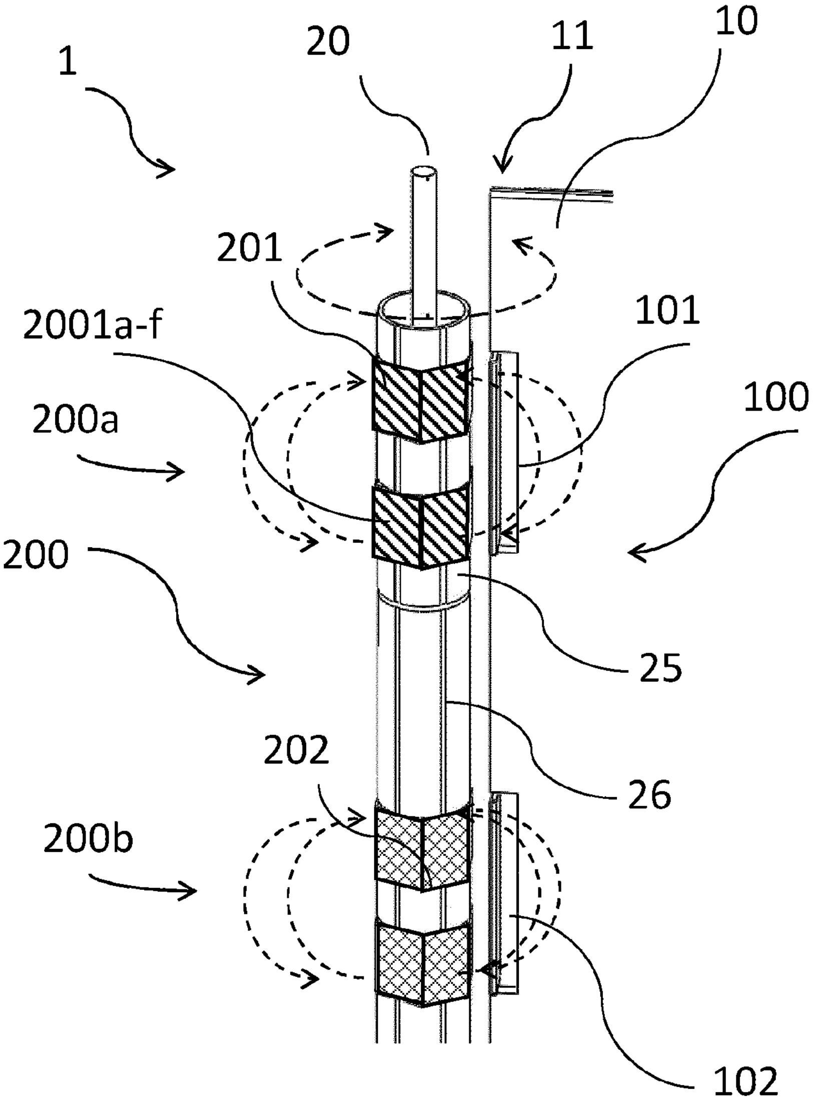
FIG. 2. Illustrates a gate post according to an embodiment of the present invention.

In FIG. 1, an overview of an electromagnetic gate arrangement 1 is shown. Typically, a door blade 10 is arranged between two gate posts 20*a*, 20*b*. Each gate post 20*a*, 20*b* is equipped with a receiving arrangement 200*a*, 200*b*. The receiving arrangement 200 of each gate post comprises a number of electromagnetic means 201, 202, 203, 204. The door blade 10 comprises a corresponding connecting arrangement 100*a*, 100*b* comprising magnetic means 101, 102, 103, 104. The magnetic means may be permanent magnets arranged to engage with the electromagnetic means 201, 202, 203, 204. In FIG. 1, the door blade 10 is fixedly connected to the gate posts 20. In FIG. 2, a schematic illustration over the receiving arrangement 200 and the connection arrangement 100 is shown. The electromagnetic means are activated by providing electromagnetic flux via an electrical current to the electromagnetic means. Depending on the direction of the electrical current, the electromagnetic means 201, 202, 203, 204 will either attract or repel the permanent magnets 101, 102, 103, 104. In that way, the door blade 10 will either engage or disengage the gate post 20. The electromagnetic means may be fed with electromagnetic flux in the direction elongation of the gate post (20), and the connecting arrangement of the door blade 10 comprises corresponding permanent magnets (101, 102, 103, 104) with magnetic poles arranged in the same direction as the magnetic flux of the electromagnetic means for attachment to the receiving arrangement (100). In FIG. 2 it is further shown that that the gate post 20 comprises a number of cylinders 25, 26. An upper cylinder 25, a middle cylinder 26 and a lower cylinder 27 (not shown). The electromagnetic means 201, 202 are in the form of a polygonal sleeve which is arranged around and concentrically with the gate post 20. In this particular embodiment, the electromagnetic means is hexagonal, which means that there are six electromagnetic facets 2001*a-f* for the permanent magnet to connect to. This also mean that each facet 2001*a-f* may connect to a corresponding door blade 10. Hence, a hexagonal electromagnetic means 201 can connect to a door blade in increments of a sixth of a full 360 degrees. In the same way, the polygonal sleeve may be triangular or square or any suitable polygon that would be suitable for a gate arrangement with a plurality of door blades and gate posts.

The receiving means typically comprises a number of electromagnetic means 201, 202, 203, 204 as seen in FIG. 1. In order to cause rotation of the door blade 10 when connected to the gate post 20, at least one of the electromagnetic means may be rotatably arranged to the gate post. In that way, the door blade 10 can swing between gate posts 20 in order to change configuration.

The electromagnetic flux is provided by an electrical current fed from a power supply (not shown). The flux direction is shown in FIG. 2 by arrows. In FIG. 2 it is also shown that the flux can be directed two ways in order to either attract or repel. The flux is determined by the electrical current.

The gate arrangement 1 may be arranged in a larger array of doors 10 and gate posts 20 in order to get the layout of a maze 500.

Referring to FIG. 3, there is shown a plurality of gate posts 20 and a plurality of door blades 10 engaged to gate posts 20. In FIG. 3, each gate post is represented as a node in an internal coordinate system. In FIG. 3, the nodes are exemplified as C3, E3, D4 and F4 wherein the letter is a row and the number is the column, which is schematically depicted in FIG. 4*a*. As seen, the node representing E3 in FIG. 4*a* has six adjacent nodes on the same distance from E3. A door blade can thus together with a gate post in E3 connect to any of the posts in those adjacent nodes. The system in FIG. 4*a* is thus a hexagonal system or arrangement. In the same way, the arrangement can be square, as depicted in FIG. 4*b*. Each node G2-G4, H2-H4 and H2-H4 have a square configuration where each node, for example node H3 have 4 adjacent nodes G3, I3, H2 and H4, on an equal distance from the H3 node. Hence, a door blade can thus together with the gate post in H3 connect to any of the gate posts in those adjacent nodes. Typically, the adjacent nodes are on an equidistance from each other so that the door blade 10 can engage between any two adjacent nodes. It should be understood that the configurations in FIGS. 4*a* and 4*b* are exemplary configurations of many possible configurations using the same inventive technique. The nodal positions may be according to any desired layout.

In order to operate the gate arrangement 1 to move the door blade 10 to the gate post 20 it is to be connected to, either the movement can be done by manual force or automatically via a drive arrangement 30. The door blade can thus be engaged to a first gate post 20*a* via the receiving arrangement 200*a* at one of the door edges 11*a*, and manually rotated around the gate post 20*a*. When the opposite door edge 12 approaches a second gate post 20*b*, the receiving arrangement 20*b* attracts the permanent magnets of the second door edge 12.

Figure 5:
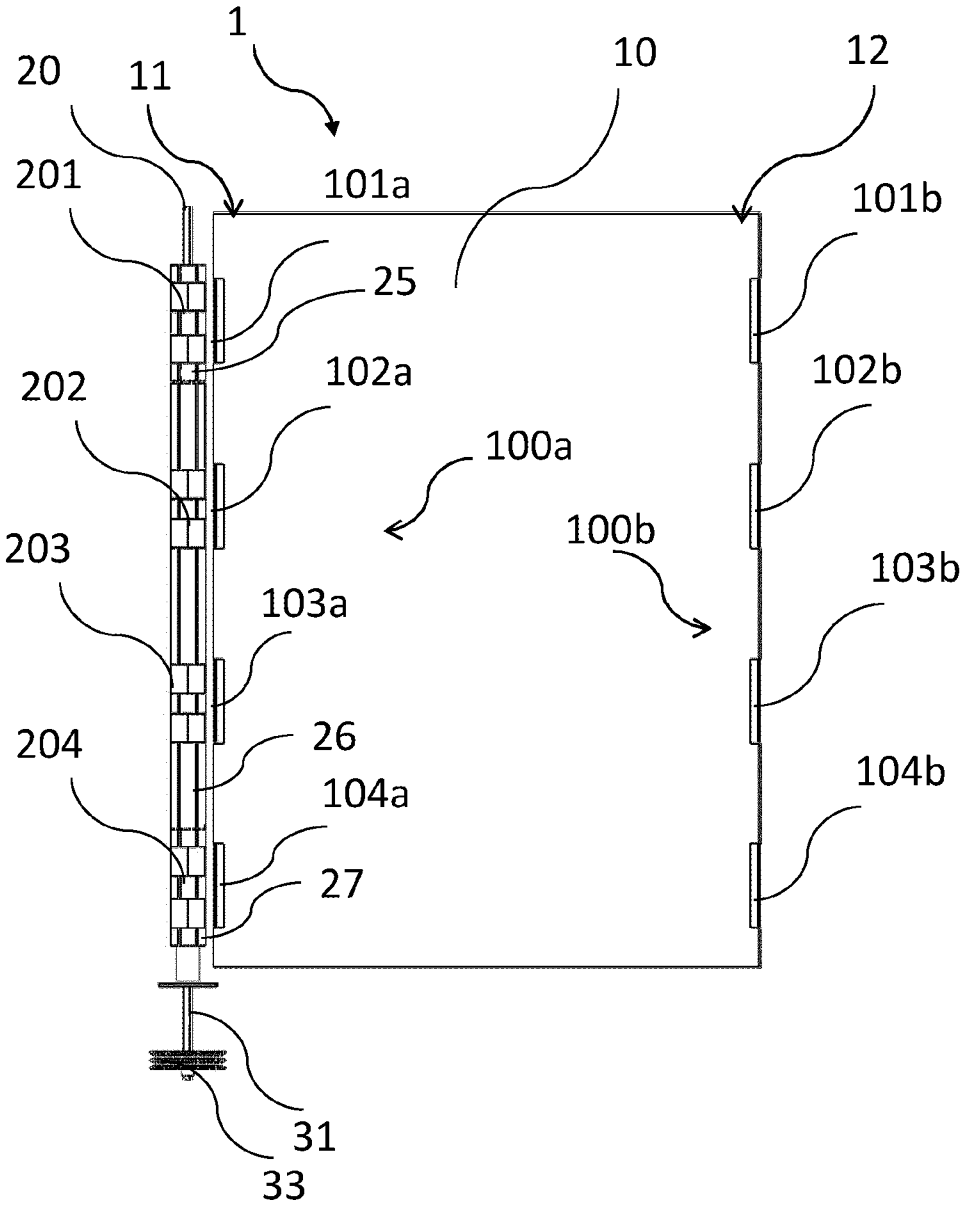
FIG. 5. Illustrates a gate arrangement according to an embodiment of the present invention.
Figure 6:
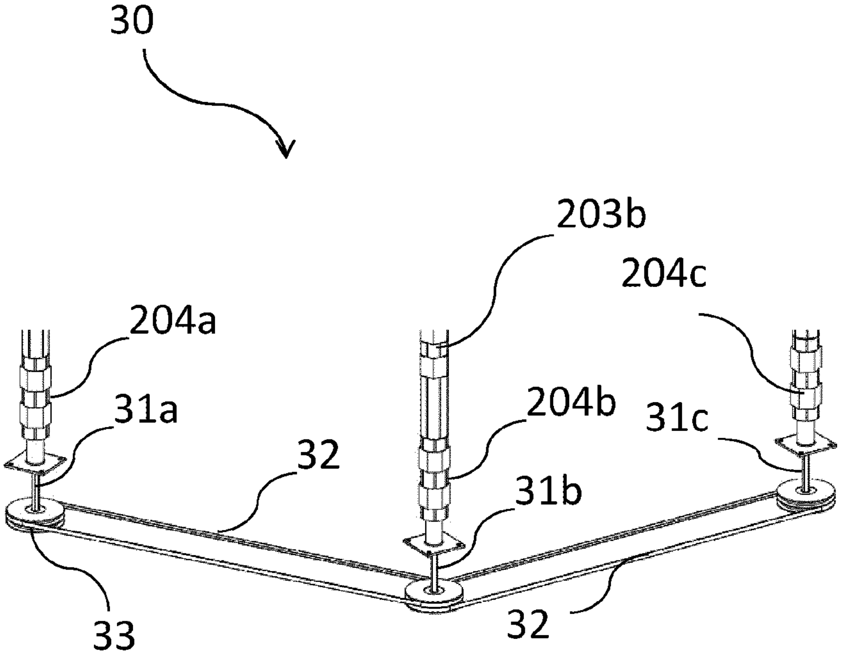
FIG. 6. Illustrates a drive arrangement according to an embodiment of the present invention.

The rotating movement can also be provided via a drive arrangement which will further be discussed in FIGS. 5 and 6. A drive arrangement 30 can provide automatic rotation, causing at least one of the electromagnetic means 201, to rotate, and thereby move a door blade 10. As mentioned previously, a gate post 20 may comprise a number of cylinders 25, 26, 27. The upper cylinder 25 may be a primary rotating cylinder 25. The middle cylinder 26 may be a static cylinder. The lower cylinder 27 may be a secondary rotating cylinder. The primary rotating cylinder 25 may be an active rotating cylinder which can be connected to a drive shaft, and thereby cause active rotation to the electromagnetic means 201 in order to rotate a connected door blade 10. The secondary rotating cylinder 27 may provide passive rotation and thus rotates along with the rotating arrangement. Typically, all cylinders are associated with at least one electromagnetic means 201, 202, 203, 204. This is to provide stability and suspending force to the door blade 10. At least one cylinder is generally a static cylinder 26. The static cylinder is fixed to the ground and may not be able to rotate. In the exemplary embodiments, this cylinder is the middle cylinder 26. However, a gate post 20 can be divided into several cylinders, and therefore a static cylinder can be located anywhere along the gate post 20. The same applies to the primary and secondary rotating cylinders. Referring now to FIG. 5, by connecting the drive shaft 31 to one of the electromagnetic means 101 via a primary rotating cylinder, that electromagnet actively rotates and brings the door blade 10 in the rotational movement. The other electric magnetic means may be either static cylinders 26 or electromagnetic secondary rotating cylinders 27. A secondary rotating cylinder 27 may allow rotation, but in contrast to the primary rotating cylinder 25, the secondary rotating cylinder 27 allows a passive rotation. The static electromagnetic cylinders 26 are static and thus non-rotating. The electromagnetic means 202, 203 on the static cylinder 26 must be disengaged from the permanent magnets before any rotation of the door blade can take place.

In FIG. 6, a drive arrangement 30 is show. It comprises a drive shaft 31 at each gate post 20. As seen in combination with FIG. 6, the drive shaft 31 extends through the gate post 20 at least to the location of the primary rotating cylinder 25. The drive shaft 31 can be rotated via a drive belt 32 or the like. A belt pulley 33 can be arranged to the drive shaft 31. The drive arrangement 30 may be driven by a motor (not shown) that causes movement to the drive belts 32. The movement can be transmitted via cascaded drive belts 32. In FIG. 6, it is shown how such drive arrangement 31 may be arranged. The drive arrangement 30 may be installed either below or above ground. If arranged below ground, only the gate posts 20 are visible. This may also prevent damage to the drive belt 32.

The electromagnets in the maze 500 and the common mains voltage motor may be controlled by electronics (not shown). A control system may be preferable in order to control the rotation and engagement of the door blades 10. A programming software may transmit instructions to the control system of a predetermined maze layout. The control system may in turn instruct the drive arrangement 30 to start drive. The control system may then instruct each affected primary rotating cylinder 25 and electromagnetic means whether to rotate, disengage or engage, and further how each electromagnetic means 201, 202, 203, 204 may operate. More options may be available.

Low voltage DC power to the posts may be fed through their respective tubes. This is in order to operate the electromagnetic means 201, 202, 203, 204.

A programming software (not shown) may communicate wirelessly with the nodes. The programming software may allow a user to program the layout of the maze 500. The layout may be interpreted by the software and communicate the new position of the drive shaft, and by that the position of the primary rotating cylinders 25*a-n* and the electromagnetic means 201*a-n*. An angle measuring system, AMS (not shown), may be adopted in each post to assist door orientation and rotation control. Depending on the configuration, and the number of the polygonal facets, the AMS may be coarse but sufficiently accurate. That is, since the rotating cylinders 25 may align in increments of a fourth or a sixth of a full revolution, the AMS may be sufficient with a simple setup using simple calculations. Alternatively, instead of an AMS, there may be a more active angle sensor or a visual arrangement.

The primary rotating cylinder 25 may rotate about the gate post axis when timely connected to the inner drive shaft 30 via a, drive clutch (not shown) inside. When disengaged, the cylinder may not be connected to the drive shaft 31 and may thus be unaffected by active rotational force from the drive shaft. The cylinder can then be rotated manually, and behave like a passive rotating cylinder. Furthermore, when the drive clutch is disengaged, the door blade 10 may be free to move manually in case of danger. However, in order to enable free rotation of the door, the static electromagnetic cylinders 202, 203 must be fully disengaged, by no electrical current flowing through the electromagnets which are connected to the static cylinder 26. Alternatively, the drive arrangement may be provided with a clutch which may cause disengagement of the drive, either between the pulley 33 and the shaft 31 or between the shaft 31 and the electromagnets.

The primary rotating cylinder 25 may line up the door at a programmed bearing to form maze paths 500 with other doors.

The static cylinder 26 may preferably be fixed to the ground and/or to the gate post 20. Its function is to hold the door in its final position after a completed movement and engagement to a connecting means 100. The receiving arrangement 200 preferably comprises at least two electromagnetic means in tandem in order to secure the vital vertical positioning of the door.

The secondary rotating cylinder 27 is rotationally, passively following the primary cylinder 201 primarily when a door is attached. The door 10 itself thus propagates the rotational energy from the primary cylinder 25. The aim and purpose of the secondary cylinder 27 is to provide stability (e.g. vertical position) to the door, whether it rotates or stands still. The secondary cylinder 27 may preferably be passive. If the secondary cylinder also would be directly connected to the drive shaft like the primary cylinder, a mechanical problem poses itself since the static cylinder is connected to the ground, and thus obstructs the static lower tube from reaching the shaft. This problem may be solved by arranging the secondary rotating cylinder at another place adjacent to the active rotating cylinder 25. However, in order to provide stability and the vertical position, the problem would likely be difficult and unnecessarily expensive.

In the connecting means 100, a plurality of strong, permanent magnets may be loosely attached to the door, for example in shallow gable slots.

The magnets may be equipped with coil springs. As a result, they can dip and swing to a certain degree for at least two reasons. Firstly, when rotation starts, the primary and secondary magnetic bonds must mitigate moments of inertia and continue to hold the door without dropping it.

Secondly, when rotation ends, as the door blade approaches the meeting post's electromagnets, these will try to "catch" the magnets on the fly which also causes moments of inertia, with the risk of door loss.

This problem may disappear when all rotation in the maze ends, since by then each door may be kept in place by posts at both gables. Thus, a considerable torque must be applied by accident or by an offender to cause damage.

The door blades may preferably be made of lightweight material to reduce the described problems. Also, nobody who could obstruct the path formation may appear in the maze while rotation is underway. For instance, an alarm signal may sound if any person or obstruction is within a proximity of the maze during drive.

The rotational speed may be any suitable speed. Preferably, rotational speed of 2 or 3 rpm may be suitable. With a lower rotational speed, such as 2-3 rpm, the risk of door loss due to moments of inertia would be practically eliminated.

A weak magnetic flux may cause the door blade to drop from its engagement from the gate post 20. If the magnetic flux density is insufficient to prevent the door from "walking" downwards after several rotations, it may be necessary to apply some sort of arrangement, e.g. a spur wheel under the door or a sheet metal underneath the lower cylinder to straighten it up. There may also be a hook, or a type of mechanical connector included in the gate post that engages with the door blade edge 11, 12.

Figure 8:
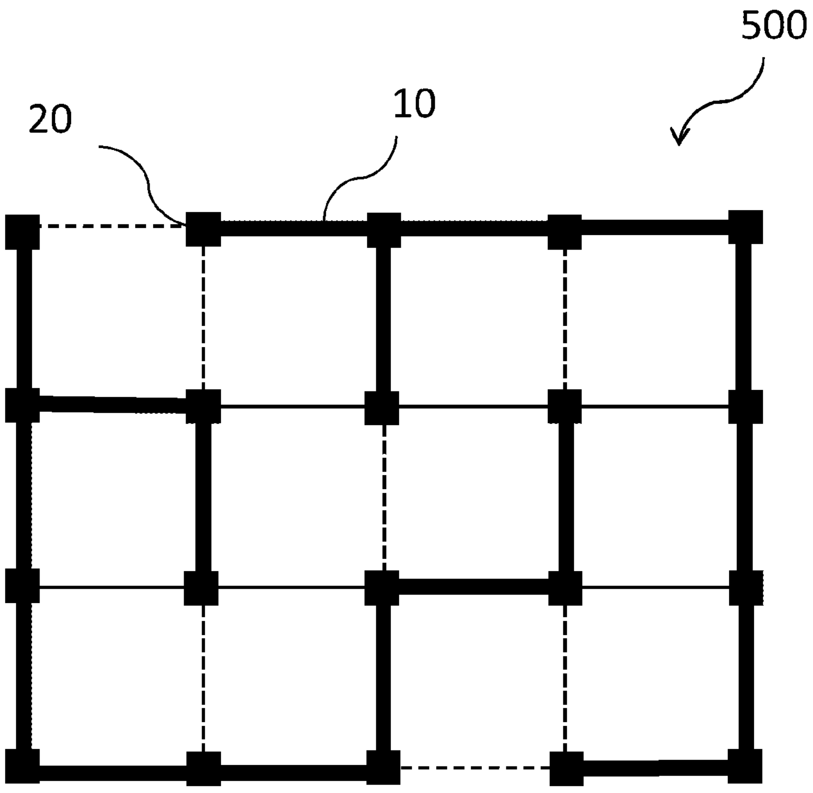
FIG. 8 illustrates an exemplary maze according to the invention.

In FIG. 8, a schematic maze is illustrated. This particular layout is a square layout having gate posts 20 in each node (not specifically numbered). As seen, some gate posts are connected to a door blade 10. Even though not explicitly shown, it should be understood that gate posts 20 and door blades are configured as the previously described gate arrangement 1. As can be seen, there is no limitation to the size of the maze. The limitation is depending on the gate post and the layout and configuration of the maze. As previously described, the number of door blades 10 that can be connected to a gate post at one time is limited by the receiving means of the gate post. A square electromagnetic sleeve may connect to four door blades at one time. A hexagonal electromagnetic sleeve may connect to six door blades at the time. FIG. 8 exemplifies the opportunities available with this type of electromagnetic maze. Together with the type of drive arrangement described in FIG. 6, the ability to easily change the layout of the maze is presented.

Drive Arrangement

The drive arrangement 30 is illustrated in FIG. 6. Preferably, the drive shafts 31 connect to a common motor (not shown). However, a maze may be divided into subunits, each subunit driving a part of the maze. A subunit may have a separate motor. The motor may be active only during door alignment via a cascaded V-belt or chain drive arrangement 30. The drive belt 32 arrangement may be placed either below or above the floor. The motor can drive the drive belts 32 in any direction, both drive and reverse, in order to align the door blades 10 as desired. Even if it mainly runs in one direction, for instance clockwise, some gate posts 20 will occasionally request anti-clockwise rotation. If so the motor reverses.

If something (e.g. belt wear) obstructs this mechanism, i.e. if at rest the magnetic facets of the primary rotating cylinders 25 become misaligned, the electronics of the gate posts 20 may preferably correct the problem by starting the motor and then engage the drive clutches until the cylinders get realigned.

By using the AMS, the gate post electronics can continually determine the facets' bearings. The system may be calibrated against the static, floor fixed cylinder, or another fixed point in the system.

Detailed Function

In the following, the function and the rotational method is explained in more detail. It should be understood that the receiving arrangements 200 and the connecting arrangements 100 may comprise a suitable number of magnetic means and corresponding electromagnetic means. Depending on the size and configuration of a maze and size and length of a gate post, more or less than the magnetic means depicted in FIGS. 1-7 may be available.

Figure 7A:
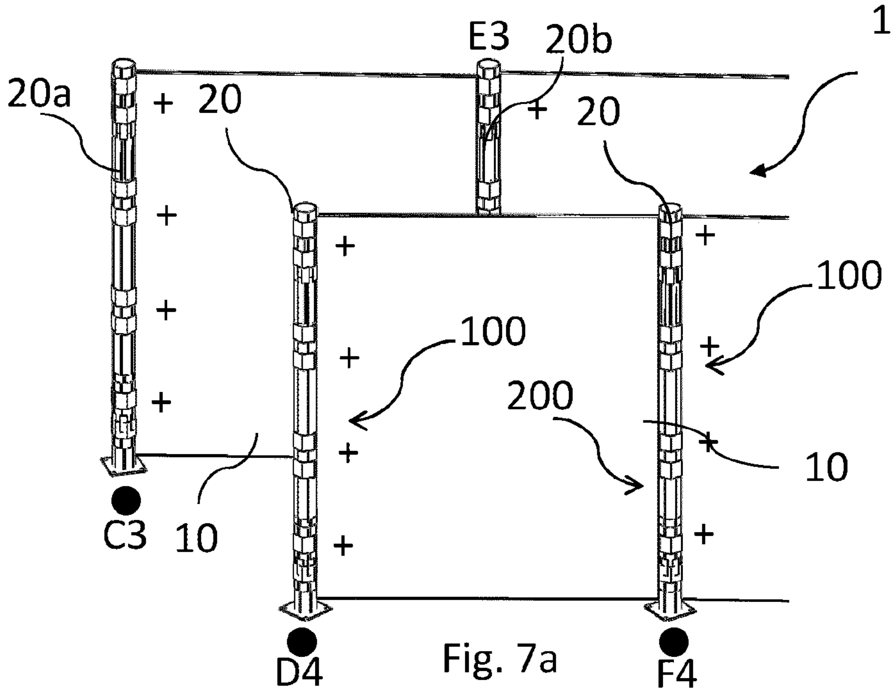
FIG. 7*a*-7*f*. Illustrates the operation of a gate arrangement according to an embodiment of the present invention.

In FIG. 7*a*, state 1 is shown. This portrays the initial position and states for a few gates in a maze 500. In this particular view, it is shown a hexagonally configured maze 500 with a specific node at the location of each gate post 20. The node designations C3, D4, E3 and F4 stem from an imaginary coordinate system where letters denote columns and numbers denote rows. The coordinate system may comprise a plurality of nodes up to node numbered Nn, where N is any desired number of columns in the system, and n is the desired number of rows in the system. Consider the door C3 being programmed to align to node D4. The numbering in FIGS. 7*a*-7*f* is substantially the same as in FIG. 3-5 but are not shown. In FIG. 7*a*-7*f*, it is specifically shown whether the electromagnets 201, 202, 203, 204 are attracting, which is represented by a plus (+), or repelling, represented by a minus (−). In state 1, all electromagnets of C3 and E3 now actively attract the door blade's 10 permanent magnets 101, 102, 103, 104, and the door 10 may thus be fixed. This may also be the state when the maze 500 is in use and all door blades are in position.

Figure 7B:
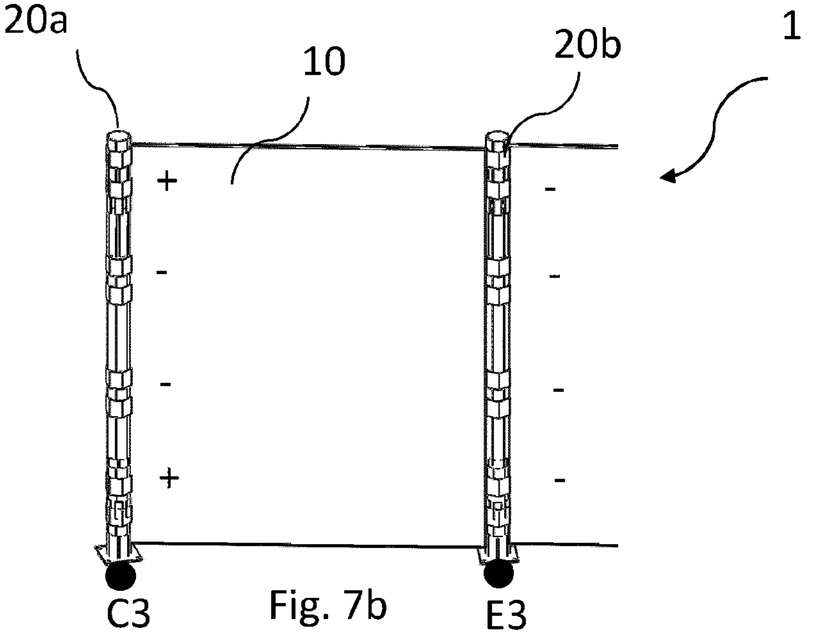

FIG. 7*b* portrays state 2, which is the state just prior to and during the first moments of rotation. Each gate post may be equipped with a drive clutch (not shown) that connects the gate post's 20 primary rotating cylinder 25 to the inner drive shaft 3 such that the common motor is connected. In state 2, the common motor starts. The drive clutch in node C3 is engaged in order to enable active rotation from the drive shaft.

The static middle cylinder 26 of C3 now applies a repelling magnetic flux (−) strong enough to just about release its door's two central permanent magnets 102, 103. For a moment, all electromagnets 201, 202, 203, 204 of node E3 now release every door that is hooked up to it. This is in order to allow complete disconnection of the door blade 10 from node E3. It should be remembered that node E3 may have other doors connected to it which are not to rotate. The reason the other door (and possible others hooked to E3) is prevented of falling to the ground is that the attraction of the post on the other side engaging the second edge may prevent it from falling. Subsequently, E3 cannot start moving its door until its magnetic fluxes no more affect the permanent magnets of the C3 door. Subsequently, the drive shaft 31 in node C3 starts rotating and the door blade 10 is ready to completely disconnect from E3.

Figure 7C:
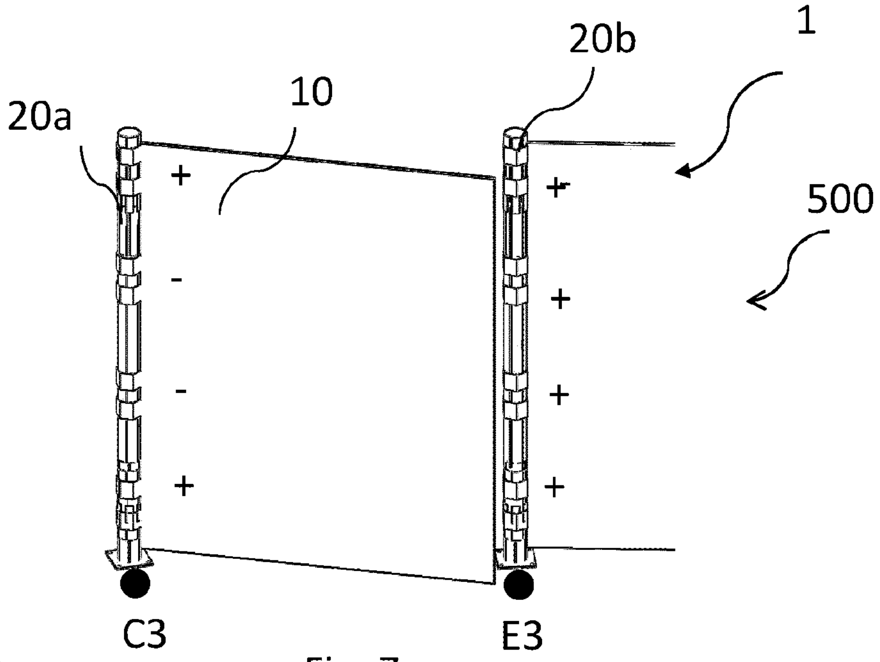

FIG. 7*c* illustrates state 3, which is representing the state after the door has rotated in C3 enough out of reach from the electromagnets of E3.

Now the electromagnets in E3 may assume its own desirable flux states as ordered by the programming software, whether it be rotation of another door blade, attraction of a potential door blade, or empty. In FIG. 7*c*, it is shown that all electromagnets in E3 are attracting (+), including the electromagnets at the static cylinder 26 which allows a door blade to be statically held in position at E3. This also means that the static cylinder 26 is connected.

Figure 7D:
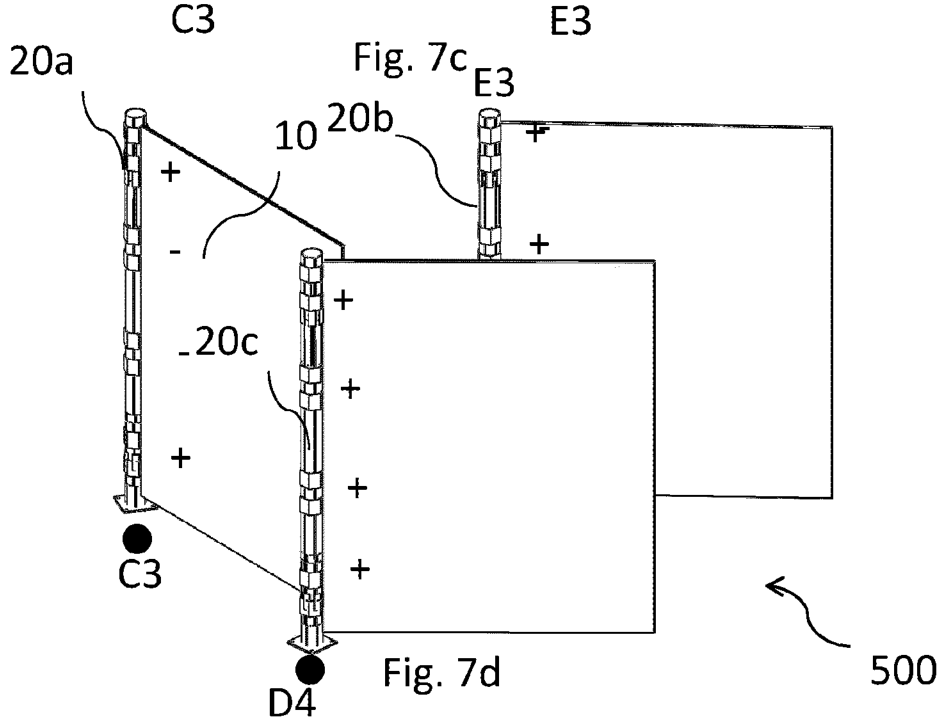

FIG. 7*d* illustrates state 4, which represents the state during rotation and approaching the destination.

As seen, C3 maintains its magnetic flux states throughout the rotation. This may be since if the electromagnets in the static cylinder 26 activates, the door would stop. This would also cause wear on the drive clutch and may cause the drive clutch or the drive to fail. The electromagnets of the gate post 20*c* in node D4 onto which the door blade 10 is approaching to connect to, may be fully activated. When the permanent magnets of the rotating door blade 10 are within reach of the electromagnetic fluxes of D4, the attraction to the electromagnets become stronger. This leads to that a considerable torque may manifest itself to the door 10 and subsequently catch the permanent magnets of the door 10. If this torque turns out to be problematic, such as the door does not connect properly or bring the door into resonance, or any other unforeseen problem, the electronics in node D4 may decrease the flux strength for a moment, without having to stop the rotation. Another possibility may be to slow down the motor speed. Such operation may require an elaborate synchronization of all moving gates. This may cause other problems or slow rotations at other nodes. Another possible solution may be to toggle the engagement of the drive clutch, thus accomplishing a slower rotation by lowering the duty cycle (pulse width modulation).

Figure 7E:
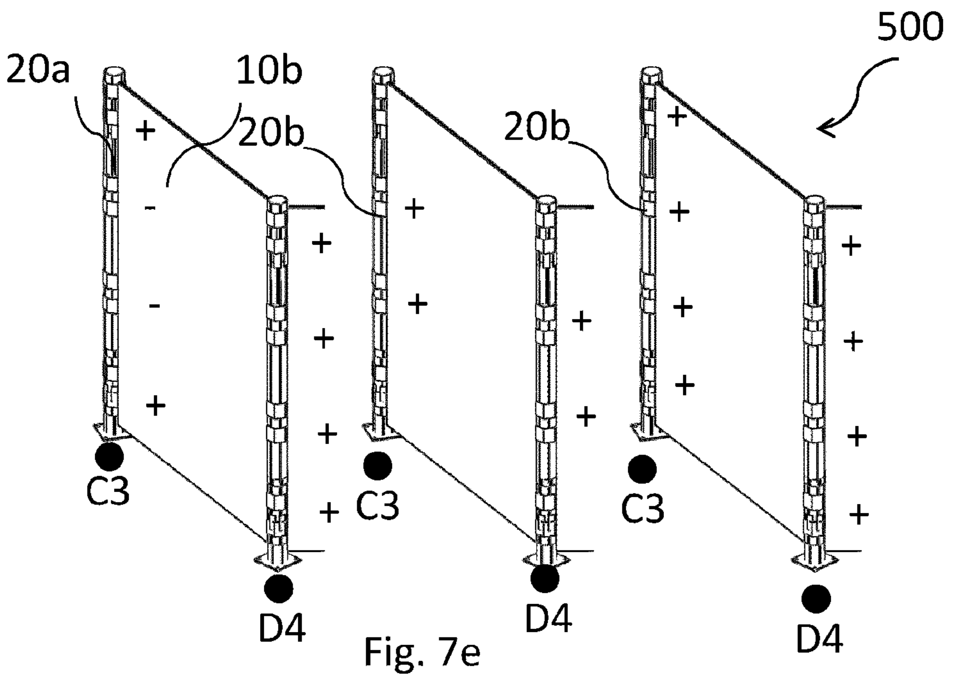

FIG. 7*e* illustrates state 5, which represents the state when the rotation stops as the door reaches its destination.

FIG. 7*e* shows three possible electromagnetic states after the door between C3 and D4 has come to rest. They all depict a locked door. It is locked since the electromagnets of at least one static cylinder is connected. The electromagnets at the rotating cylinders 25, 27 may or may not be connected. If it is not connected, the electromagnetic flux may be completely off. It can also be seen that node D4 has two doors connected to it. Both doors are locked in position by the engagement to the static cylinder 26.

Figure 7F:
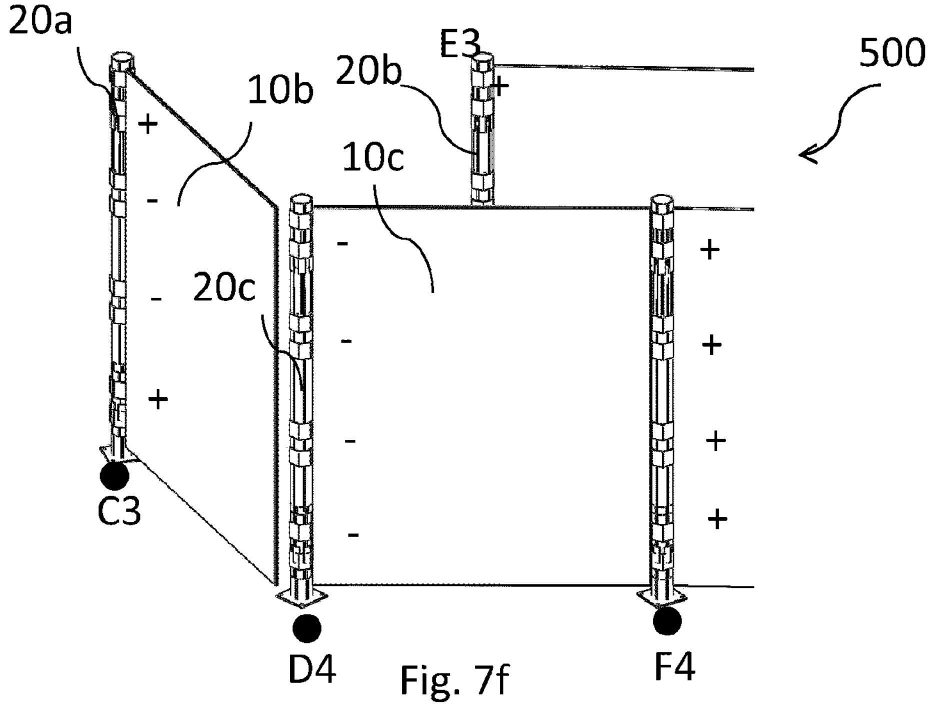

FIG. 7*f* illustrates state 6, which represents the state of releasing of one of several doors hooked to a node. In FIG. 7*f*, a solution is presented to when it may be desired to move the second door blade 10*c* between D4 and F4, without also displacing the first door blade 10*b* between C3 and D4. A solution may be to activate the electromagnets of node C3 and move the first door blade 10*b* between C3 and D4 a little bit passed from the magnetic flux of D4, and then disengage the drive clutch in C3 to halt its rotation. During the next moment, the drive clutch of node D4 and its upper 201 and lower 204 electromagnets become activated to start rotation of one or more remaining door blades 10*c* hooked to the node F4.

Finally, to reverse the first door blade 10*b* to its intended position connected to the gate posts 20 in nodes C3 and D4, the motor may reverse. The same applies for any other door blades that may be hooked to D4 that should not have moved.

State 7 represents the state of reversing any door blade rotation. Reversing of the rotation may be done substantially as described in previous states when the motor is forward driving, with the exception that the motor reverses. Reversing may be needed as described under State 6 above, but also to avoid collision between door blades in certain situations.

The gate arrangement may also be configured to move a door blade between several gate posts in the maze, for instance from node C3 to F4. The relevant door blade may then be handed over from one gate post to another in several steps until the door has reached a new destination. The hand-over may be done as during the rotation steps as described above, but the door blade may need several of those steps involving more than two gate posts in order to arrive at its new gate post.

Since programming of the various paths could result in a vastness of short and long rotations, wait states and reverse drive, it is preferred even if not critical that the overall software presents certain intelligence to group all scenarios into a reduced number of simultaneous events, e.g. different gates may rotate in the same operation. Preferably, gates which are programmed to rotate similarly far, i.e. the same angle, may move at the same time. This may be most time efficient and may also prevent correcting steps.

Since the individual gate may be motorless, the overall cost for the driving arrangement can also be reduced considerably.

The gate arrangement according to the invention may allow for individual doors to propagate through the maze and be connected to almost any node, to form a multitude of exciting paths and obstacles.

To enable more than one door blade to be connected to a gate post, solves a sometimes-difficult problem to prevent "leaks" (shortcuts) in an intended maze path, due to lack of obstructing doors.

The maze may be configured such that each gate post, preferably motor driven, has two doors attached to it, that effectively prevents short or long straight paths. This invention is not afflicted with that disadvantage since a door blade may be directed towards any other adjacent gate post.

Preferably, emergency stops (not shown) will be placed at several locations in the maze. When pressed in case of danger, they will disconnect the mains power to the common motor, as well as the DC power to the gates. This allows all electromagnets to disconnect. Due to magnetic flux roundtrips from the permanent magnets and the iron cores of the electromagnets, the gate doors may still be loosely hooked to their posts, but with little effort they could be rotated manually or simply be kicked down. A maze as described may be placed in a play area for children. Hence, relevant safety measures and precautions may be available. For instance, the door blades may be light enough to minimize injury from the weight. The use of the invention may be to create programmable mazes for amusement and for learning.

Control System

The Control System in Principle

Each gate post 20 may comprise all the electronics needed to control its rotation. Everything may be housed on a circuit board somewhere in the pole. Due to the space available, the circuit board may be sufficiently narrow.

A wireless (or wired) receiver and transmitter may typically be available.

In wired communication, the signal wiring may run parallel to the power supply in a longitudinal channel in and/or partially on the outside of the drive shaft.

For wireless communication, the receiver and transmitter may be located on the common circuit board inside the gate post.

Power electronics may be available. The power electronics may supply the currents to the drive clutch and the electromagnets and may provide a total and permanent disconnection in the event of danger or panic.

The electronics may receive control signals from the overall software/hardware and generate currents at the right time for the drive clutch and the electromagnets. A simple angle measurement system (AMS—Angle Measurement System) with a resolution of a few degrees, if necessary, a higher resolution may be implemented, may measure, and determine the rotation of the pole. As shown above, the system preferably constantly keep track of the angle of rotation of the gate post 20, so that each door blade 10 connected to the gate post 20 will align correctly in the maze, or to not cause collisions and other chaos in it.

The AMS may also report to the overall software when the door blades have finalised its rotation or when the gate post signals that a rotational change of the main motor must be made to complete the orientation of the attached door blades.

The purpose is that the electronics may, as far as possible, relieve the overall software from minor decisions, such as stopping a rotation to release another door, etc.

The electronics may also preferably report to the overall software when errors occur during rotation so that a misaligned door blade can be automatically reset, in the case that the error is so serious that an external action may be needed.

The signalling protocol for communication may be sufficiently intelligently designed that the electronics can handle virtually the entire contents of a rotation order, in order to reduce or completely eliminate unnecessary signal traffic back and forth.

A separate electronics design may be provided to control the common motor. That construction also suitably incorporates electronics for the communication between the overall software/hardware and the gate posts. It can also incorporate electronics for longer-distance communication between a remote computer and the maze, and perhaps the transmission of surveillance video.

In the drawings and specification, there have been disclosed preferred embodiments and examples of the invention and, although specific terms are employed, they are used in a generic and descriptive sense only and not for the purpose of limitation, the scope of the invention being set forth in the following claims.

ITEMIZED LIST OF EMBODIMENTS

1. An electromagnetic gate arrangement (1) comprising
   a door blade (10)
   having a first edge (11) and
   a second edge (12),
   at least a first gate post (20*a*) and
   a second gate post (20*b*), wherein
   the door blade (10), at the first and second edge (11, 12) respectively, comprises
   a connecting arrangement (100) comprising magnetic means (101, 102, 103, 104) and
   the first and second gate post (20) comprises a respective first and second receiving arrangement (200*a*, 200*b*) comprising electromagnetic means (201, 202, 203, 204), wherein the electromagnetic means (201, 202, 203, 204) are active by electromagnetic flux provided via an electric current for enabling detachable engagement between the gate posts (20) and the door blade edge (10), wherein the first receiving arrangement (200*a*) is arranged for enabling rotational movement of the door blade (10) around the first gate post (20) when disengaged from the second receiving arrangement (210).
2. Electromagnetic gate arrangement (1) according to embodiment 1, wherein the gate post (20) comprises at least one cylinder (25, 26, 27) arranged concentrically with the gate post and at least partially around the circumference of the gate post (20), wherein a first cylinder is a primary rotating cylinder (25) providing active onto which electromagnetic means (201) is arranged to provide rotation to the receiving arrangement (200).
3. Electromagnetic gate arrangement (1) according to embodiment 2, wherein a second cylinder is a secondary rotating cylinder (27) onto which electromagnetic means (204) is arranged for providing passive rotation and stability to the arrangement, and a third cylinder is a static cylinder (26) onto which electromagnetic means (202, 203) is arranged for static non-rotating position.
4. Electromagnetic gate arrangement (1) according to any of the preceding embodiments, wherein the electromagnetic means (201, 202, 203, 204) is arranged to provide attraction to the magnetic means (101, 102, 103, 104) through positive electric flux for engagement, and to repel the magnet means (101, 102, 103, 104) through reversed negative flux for disengagement of the door blade (10).
5. Electromagnetic gate arrangement (1) according to embodiment 1, wherein the electromagnetic means (201, 202, 203, 204) is in the form of a polygonal sleeve having equally spaced facets (2001*a-f*) around the circumference, and wherein the connecting arrangement (100) of the door blade (10) comprises corresponding permanent magnets for engagement to the facet (2001*a-f*).
6. Electromagnetic gate arrangement (1) according to any of the preceding embodiments further comprising a drive arrangement (30) for providing rotation to the receiving arrangement (200).
7. Electromagnetic gate arrangement (1) according to embodiment 6 further comprising a third gate post (20*c*) comprising a third receiving arrangement (200*c*) comprising electromagnetic means (201*c*, 202*c*, 203*c*, 204*c*) and arranged for moving a door blade (10) into a predetermined position, the gate arrangement (1) being arranged to:
   disconnect the electromagnets (202, 203) at the static cylinder (26) at the first gate post (20*a*),
   disconnect the door blade (10) at the second edge (12) by disconnecting the first electromagnetic means (201*a*, 202*a*, 203*a*, 204*a*) of the second gate post (20*b*) from corresponding permanent magnets (101, 102, 103, 104),
   rotate the door blade (10) at the first door post (20*a*) by providing rotation to the primary rotating cylinder (25) via the drive arrangement (30),
   activate a third receiving arrangement (200*c*) by applying an electromagnetic flux of the electromagnetic means (201*c*, 204*c*) at the primary rotating cylinder (25) of the third gate post (20*c*) in order to attract and engage with the receiving arrangement (100*a*) of the second edge (12) when approaching the third gate post (20*c*), and
   upon engagement of the third receiving arrangement (200*c*), engage at least one of the electromagnetic means (202*a*, 202*c*, 203*a*, 203*c*) of the static cylinder (26) at first and/or third gate post (20*a*, 20*c*) to the corresponding permanent magnets (102, 103) at the door edge (12).
8. Method for operating an electromagnetic gate arrangement (1) comprising
   a door blade (10) having
   a first edge (11), and a second edge (12), a connecting arrangement (100*a*, 100*b*) comprising magnetic means (101*a-b*, 102*a-b*, 103*a-b*, 104*a-b*) and which connecting means is arranged at the respective edge (11, 12)

a plurality of gate posts (20*a*, 20*b*, . . . 20*n*), wherein a first gate post (20*a*) and a second gate post (20*b*) comprises a respective first and second receiving arrangement (200*a*, 200*b*), each comprising electromagnetic means (201, 202, 203, 204) wherein the electromagnetic means are activated by electromagnetic flux provided via an electric current, for enabling detachable engagement between the gate posts (20*a*, 20*b*) and the door blade edge (11, 12), wherein the first receiving arrangement (200*a*) is arranged for rotational movement of the door blade (10) around the first gate post (20*a*) when disengaged from the second receiving arrangement (200*b*), wherein the method comprises the steps:

in an initial fixed state, providing attracting electromagnetic flux to the electromagnetic means (201*a-b*, 202*a-b*, 203*a-b*, 204*a-b*) of the receiving arrangement (200*a*, 200*b*) to attract the magnetic means (101*a-b*, 102*a-b*, 103*a-b*, 104*a-b*) of the door blade (10) to cause engagement between the first and second connecting arrangements (100*a*, 100*b*) of the door blade (10) and the receiving arrangements (200*a*, 200*b*), in a movement preparation state, providing a repelling electromagnetic flux to at least one of the electromagnetic means (201*b*, 202*b*, 203*b*, 204*b*) for repelling and disconnecting the connecting arrangement (100*b*) of the second door edge (12), moving the door (10) by applying rotation to the receiving means (200*a*) of the first gate post (20*a*) while connected to the connecting arrangement (100*a*) at the first door edge (11), apply attracting electric flux to the receiving arrangement (200*c*) of a third gate post (20*c*) when the second door edge (12) is approaching the third gate post (20*c*) so that the magnets of the connecting arrangement (100*b*) of the second door edge (12) attracts the electric-magnetic means (201*c*, 202*c*, 203*c*, 204*c*) of the third gate post (20*c*) and engages to the door blade (10).

9. Method according to embodiment 8, wherein the gate arrangement (1) comprises a plurality of gate posts (20*a*, 20*b*, . . . 20*n*) arranged in an array of positional nodes (A1, A2, A3 . . . , B1, B2, B3 . . . , Nn) numbered according to an internal coordinate system, wherein a door blade (10) connected to a gate post (20*a*) at one node is connectable to a gate post (20*n*) adjacent to that node.

10. Driving arrangement (30) for providing rotational movement of a door blade (10) of a gate arrangement (1) according to embodiments 1-7, comprising a motor, a drive shaft (31*a-n*) arranged concentrically with a gate post (20*a-n*), a drive means (32*a-n*) for transmitting the movement between motor and drive shaft (31*a-n*), wherein the drive shaft (31*a-n*) is in connection with the receiving arrangement (200*a-n*) via a primary rotating cylinder (25) of the gate post (20) onto which electromagnetic means (201) of the receiving arrangement (200) is arranged, so that upon drive of the motor, the movement is transmitted via the drive means (32) to the drive shaft (31), causing rotation of the drive shaft (31) and thereby causing rotation of the receiving arrangement (200*a-n*).

12. Driving arrangement (30) according to embodiment 11, wherein the drive means (32) is connected to the drive shaft (31) via a pulley element (33), such as a belt pulley, sprocket wheel, spur gear or the like, and wherein the drive means (32) is a belt, chain, wire rope or the like.

13. Driving arrangement according to embodiment 12, wherein a first drive means (32*a*) is arranged in a cascaded manner to a second drive means (32*b*) via the pulley arrangement so that drive of a common motor transmits movement to a plurality of drive means (32) in the gate arrangement (1).

14. Driving arrangement (30) according to any of the embodiment 10-13, further comprising a drive clutch in the gate post (20) which upon deactivation causes disengagement of the transmission of movement between the primary rotating cylinder (25) and the drive shaft (31) in order to allow free rotation of the receiving arrangement (200) independent of the drive shaft (31).

15. A programmable maze (500) comprising an electromagnetic gate arrangement (1) according to embodiment 1-7 comprising a plurality of gate posts (20*a*, 20*b*, . . . 20*n*) arranged in an array of positional nodes (A1, A2, A3 . . . , B1, B2, B3 . . . , Nn) numbered according to an internal coordinate system, comprising at least one door blade (10) connected to a gate post (20*a*) at one node, wherein the door blade (10) is connectable to a gate post (20*n*) adjacent to that node in response to a communication signal from a programming software.

16. Control system for controlling a programmable maze (500) comprising an electromagnetic gate arrangement according any of the embodiment 1-7, wherein the control system comprises a programming software programmable according to a desired layout of the maze, wherein the programming software being configured to communicate with a driving arrangement (30) according to any of the embodiments 11-15, an electronic communication device arranged in each operable gate post (20), an angle measurement system for determining the amount of rotation to be applied by the driving arrangement (30), wherein the control system is arranged to:

receive an instruction from the programming software of a predetermined maze layout, wherein the maze layout is presented in an internal coordinate system stating a plurality of nodes which presents the gate post (20*a*, . . . 20*n*)

transmit, to each node (A1, . . . Nn), nodal angular instruction in order to achieve the predetermined maze layout, start the common motor in order to start drive of the drive means (32) to cause rotation of the drive shafts (31), in the node in which a gate post (20) is arranged not to rotate, disengage a drive clutch in order to prevent rotation from the drive shaft.

The invention claimed is:

1. An electromagnetic gate arrangement, comprising:

a door blade having a first edge and a second edge, at least a first gate post and a second gate post, wherein the door blade, at each of the first and second edges, comprises a connecting arrangement comprising one or more permanent magnets, and the first and second gate posts comprise a first receiving arrangement and a second receiving arrangement, respectively, the first receiving arrangement comprising one or more first electromagnets and the second receiving arrangement comprising one or more second electromagnets, wherein the one or more first and second electromagnets are configured to be activated by electromagnetic flux provided via an electric current to enable detachable engagement between the first and second gate posts and the first and second edges of the door blade, wherein the first receiving arrangement is configured to enable rotational movement of the door blade around the first gate post when the door blade is disengaged from the second receiving arrangement, and wherein the one or more first electromagnets of the first gate post are rotatable around the first gate post via the first receiving arrangement.

2. The electromagnetic gate arrangement according to claim 1, wherein at least one of the first gate post and the second gate post comprises at least one cylinder arranged concentrically with the respective first or second gate post and at least partially around a circumference of the respective first or second gate post, wherein a first cylinder of the at least one cylinder is a primary rotating cylinder onto which at least one of the one or more first and second electromagnets is arranged, and the primary rotating cylinder is adapted to provide rotation to the respective first or second receiving arrangement.

3. The electromagnetic gate arrangement according to claim 2, wherein a second cylinder of the at least one cylinder is a secondary rotating cylinder onto which at least one of the one or more first and second electromagnets is arranged to provide passive rotation and stability to the arrangement, and a third cylinder of the at least one cylinder is a static cylinder onto which at least one of the one or more first and second electromagnets is arranged to provide a static non-rotating position.

4. The electromagnetic gate arrangement according to claim 3, further comprising a drive arrangement configured to provide a rotation to the first receiving arrangement, and further comprising a third gate post comprising a third receiving arrangement comprising one or more third electromagnets and configured to move the door blade into a predetermined position, the gate arrangement being arranged to:

disconnect the at least one of the one or more first and second electromagnets arranged on the static cylinder at the first gate post, disconnect the door blade at the second edge by disconnecting the one or more first electromagnets of the second gate post from the one or more permanent magnets at the second edge of the door blade, rotate the door blade at the first gate post by providing rotation to the primary rotating cylinder via the drive arrangement, activate the third receiving arrangement by applying electromagnetic flux to at least one of the one or more third electromagnets at the primary rotating cylinder of the third gate post in order to attract and engage with the one or more permanent magnets at of the second edge of the door blade when the second edge is approaching the third gate post, and upon engagement of the third receiving arrangement, engage at least one of (i) the one or more first and second electromagnets arranged on the static cylinder of the first gate post and (ii) the one or more third electromagnets arranged on the static cylinder of the third gate post to the one or more permanent magnets at the first or second edge of the door blade.

5. The electromagnetic gate arrangement according to claim 1, wherein each of the one or more first and second electromagnets is arranged to provide attraction to the one or more permanent magnets through positive electromagnetic flux for engagement of the door blade, and to repel the one or more permanent magnets through reversed negative electromagnetic flux for disengagement of the door blade.

6. The electromagnetic gate arrangement according to claim 1, wherein each of the one or more first and second electromagnets is provided in the form of a polygonal sleeve having equally spaced facets around a circumference, and wherein the connecting arrangement of the door blade comprises corresponding ones of the one or more permanent magnets configured to engage a corresponding one of the facets.

7. The electromagnetic gate arrangement according to claim 1, further comprising a drive arrangement configured to provide a rotation to the first receiving arrangement.

8. A driving arrangement for providing rotational movement of the door blade of the electromagnetic gate arrangement according to claim 1, comprising a motor, a drive shaft arranged concentrically with a gate post, and a drive element configured to transmit the rotational movement from the motor to the drive shaft;

wherein the drive shaft is in connection with the first receiving arrangement via a primary rotating cylinder of the first gate post onto which at least one of the one or more first electromagnets of the first receiving arrangement is arranged so that upon operation of the motor, the movement is transmitted via the drive element to the drive shaft, causing rotation of the drive shaft and thereby causing rotation of the first receiving arrangement.

9. The driving arrangement according to claim 8, wherein the drive element is connected to the drive shaft via a pulley element, and wherein the drive element is selected from the group consisting of a belt, a chain, and a wire rope.

10. The driving arrangement according to claim 9, wherein the drive element is a first drive element arranged in a cascaded manner with a second drive element via a pulley arrangement so that drive of the motor transmits movement to each of the first and second drive elements, and wherein the motor is a common motor.

11. The driving arrangement according to claim 9, wherein the pulley element is selected from the group consisting of a belt pulley, a sprocket wheel, and a spur gear.

12. The driving arrangement according to claim 8, further comprising a drive clutch in at least one of the first gate post and the second gate post, wherein the drive clutch is configured, upon deactivation thereof, to cause disengagement of movement transmission between the primary rotating cylinder and the drive shaft in order to allow free rotation of the first receiving arrangement independent of the drive shaft.

13. A programmable maze comprising the electromagnetic gate arrangement according to claim 1, the programmable maze further comprising a plurality of gate posts including at least the first and second gate posts, which are arranged in an array of positional nodes numbered according to an internal coordinate system, and wherein the door blade is connectable to the first gate post at one node and is connectable to the second gate post adjacent to that node in response to a communication signal.

14. The programmable maze according to claim 13, further comprising:

a common motor;

a plurality of drive shafts, each drive shaft arranged concentrically with a respective one of the plurality of gate posts and driven by the common motor;

an electronic communication device arranged in each of the plurality of gate posts;

an angle measurement system configured to determine an amount of rotation to be applied by each of the drive shafts; and a control system configured to control the programmable maze, wherein the control system is configured to be programmed according to a desired layout of the programmable maze, the control system being further configured to communicate with the common motor and the electronic communication devices, wherein the control system is further configured to:

receive an instruction from the control system of a predetermined maze layout, wherein the maze layout is presented in an internal coordinate system and identifies a plurality of nodes each corresponding to one of the gate posts, transmit, to each of the nodes, a nodal angular instruction in order to achieve the predetermined maze layout, start the common motor in order to cause the plurality of drive shafts to rotate, and in the node in which a selected gate post of the plurality of gate posts is arranged not to rotate, disengage a drive clutch in order to prevent rotation from the respective drive shaft.

15. A method for operating an electromagnetic gate arrangement, the electromagnetic gate arrangement comprising:

a door blade having a first edge and a second edge, a connecting arrangement comprising one or more permanent magnets arranged at each of the first and second edges of the door blade, a plurality of gate posts including a first gate post and a second gate post, the first gate post comprising a first receiving arrangement and the second gate post comprising a second receiving arrangement, each of the first and second receiving arrangements comprising one or more electromagnets, wherein the one or more electromagnets are configured to be activated by electromagnetic flux provided via an electric current configured to enable detachable engagement between the first and second gate posts and the first and second edges of the door blade, wherein the first receiving arrangement is configured to enable rotational movement of the door blade around the first gate post when the door blade is disengaged from the second receiving arrangement, wherein the method comprises the steps:

in an initial fixed state, providing attracting electromagnetic flux to the one or more electromagnets of the first and second receiving arrangements, respectively, to attract the corresponding one or more permanent magnets of the door blade to cause engagement between the connecting arrangement of the door blade and the first and second receiving arrangements, in a movement preparation state, providing repelling electromagnetic flux to at least one of the one or more electromagnets to repel and disconnect the connecting arrangement at the second edge of the door blade, moving the door blade by applying rotation to the first receiving arrangement while the first receiving arrangement is connected to the connecting arrangement at the first edge of the door blade, and applying attracting electromagnetic flux to the one or more electromagnets of a third receiving arrangement of a third gate post when the second edge of the door blade is approaching the third gate post so that the one or more permanent magnets of the connecting arrangement at the second edge of the door blade attract the one or more electromagnets of the third gate post and the third gate post engages the door blade.

16. The method according to claim 15, wherein the plurality of gate posts is arranged in an array of positional nodes numbered according to an internal coordinate system, and wherein a selected door blade connected to a selected gate post at a selected node is connectable to another selected gate post adjacent to that selected node.

* * * * *